US008542698B1

(12) United States Patent
Banerjea et al.

(10) Patent No.: US 8,542,698 B1
(45) Date of Patent: *Sep. 24, 2013

(54) METHODS AND APPARATUS FOR SWITCHING TRANSMISSION CHANNELS

(75) Inventors: Raja Banerjea, Sunnyvale, CA (US); Milind Kopikare, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 78 days.

This patent is subject to a terminal disclaimer.

(21) Appl. No.: 13/175,527

(22) Filed: Jul. 1, 2011

Related U.S. Application Data

(63) Continuation of application No. 11/945,165, filed on Nov. 26, 2007, now Pat. No. 7,974,299.

(60) Provisional application No. 60/867,264, filed on Nov. 27, 2006.

(51) Int. Cl.
*H04L 12/28* (2006.01)

(52) U.S. Cl.
USPC .......................................................... 370/431

(58) Field of Classification Search
USPC ................ 370/431, 229–235, 310, 328, 437, 370/464, 465; 455/450–453
See application file for complete search history.

(56) References Cited

U.S. PATENT DOCUMENTS

| 6,519,461 | B1 * | 2/2003 | Andersson et al. | ........... 455/453 |
|---|---|---|---|---|
| 6,697,626 | B1 | 2/2004 | Eidson et al. | |
| 7,206,840 | B2 | 4/2007 | Choi et al. | |
| 7,443,830 | B2 | 10/2008 | Engels et al. | |
| 7,606,928 | B2 * | 10/2009 | Wang et al. | .................... 709/233 |
| 7,974,299 | B1 * | 7/2011 | Banerjea et al. | .............. 370/431 |

OTHER PUBLICATIONS

IEEE 802.11 k 05.0 Draft Standard for Information technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 1: Radio resource Measurement, IEEE Computer Society, Aug. 2006, pp. 1-178, IEEE, New York, NY.

802.11 k-2008 IEEE Standard for Information technology—Telecommunications and information exchange between systems—Local and Metropolitan Area Networks—Specific requirements, Part 11: Wireless LAN Medium Access Control (MAC) and Physical Layer (PHY) Specifications, Amendment 1: Radio resource Measurement, IEEE Computer Society, Jun. 12, 2008, pp. 1-244, IEEE, New York, NY.

802,16e IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Micorwave Theory and Techniques Society, 2005, pp. 1-864, IEEE, New York, NY.

(Continued)

*Primary Examiner* — Dmitry H Levitan

(57) ABSTRACT

Methods and apparatus for switching transmission channels that include monitoring a number of packets within a transmitter buffer of a transmitter, determining that the number of packets within the transmitter buffer exceeds a pre-determined threshold, and changing a transmission channel used by the transmitter for transmission based at least upon the number of packets within the transmitter buffer exceeding a pre-determined threshold.

19 Claims, 5 Drawing Sheets

(56) References Cited

OTHER PUBLICATIONS 802.16 IEEE Standard for Local and metropolitan area networks, Part 16: Air Interface for Fixed Broadband Wireless Access Systems, IEEE Computer Society and the IEEE Microwave Theory and Techniques Society, 2001, pp. 1-349, The Institute of Electrical and Electronics Engineers, Inc., New York, NY.

802.11 h IEEE Standard for Information technology—Telecommunications and information exchange between systems—Local and metropolitan area networks—specific requirements, Part 11: Wireless LAN Medium Access Control (MAC) and Physical Layer (PHY) specifications, Amendment 5: Spectrum and Transmit Power Management Extensions in the 5 GHz band in Europe, 2003, pp. 1-75, The Institute of Electrical and Electronics Engineers, Inc., New York, NY.

Syed Aon Mujtaba, 802.11 IEEE Wirless LANs, TGn Sync Proposal Technical Specification, May 18, 2005, pp. 1-131, Allentown, PA.

802.11 k IEEE Draft Standard for Information Technology—Telecommunications and information exchange between systems—Local and metropolitan area networks—Specification requirements, Part 11: Wireless LAN Medium Access Control (MAC) and Physical Layer (pHY) specifications, Amendment: Radio Resource Measurement, LAN/MAN Standards Committee of the IEEE Computer Society, Jan. 2007, pp. 1-194, IEEE, New York, NY.

* cited by examiner

METHODS AND APPARATUS FOR SWITCHING TRANSMISSION CHANNELS

CROSS REFERENCE TO RELATED APPLICATIONS

The present disclosure is a continuation of U.S. application Ser. No. 11/945,165 filed on Nov. 26, 2007 (U.S. Pat. No. 7,974,299), which claims priority under 35 U.S.C. §119(e) to U.S. Provisional Application No. 60/867,264, filed Nov. 27, 2006.

TECHNICAL FIELD

The present invention relates to an enhanced channel selection mechanism, and more particularly, to an enhanced channel selection mechanism for ensuring switching between transmission channels within a wireless communication network seamlessly and with minimal disruption of reception of a transmitted signal.

BACKGROUND

Multimedia transmission, especially video distribution into one's home, requires high bandwidth and low latency. Historically, wireless communication systems have not been able to meet such requirements. The IEEE 802.11n provides a high band width transmission protocol. However, this protocol allows for a maximum channel unavailability duration of 200 milliseconds. Such lack of channel availability may be caused due to interference, a deep fade because of reflections, etc.

During such an unavailability period, it may be best to switch to a new transmission channel rather than retrying transmission on the same channel. IEEE 802.11h and 802.11k standards allow for dynamic channel switching initiated by an access point (AP) within a wireless communication network. The standards also allow for subscribers within the wireless communication network to provide feedback to the AP as to the transmission quality of the current channel as measured by the subscribers. However, the IEEE 802.11h standard is primarily directed to detection of radar and switching to another channel due to radar interference on the current transmission channel. The IEEE 802.11k standard, at the present time of writing, has yet to be standardized. In any event, neither of these schemes address the questions as to how to detect that a current transmission channel has interference and how to optimally, or when to optimally, move to a clear transmission channel.

SUMMARY

The present invention provides a method that includes monitoring a number of packets within a transmitter buffer of a transmitter, determining that the number of packets within the transmitter buffer exceeds a predetermined threshold, and changing a transmission channel used by the transmitter for transmission based at least upon the number of packets within the transmitter buffer exceeding a predetermined threshold.

In accordance with various embodiments of the present invention, the method further includes monitoring a number of packets within a receiver buffer of a receiver and determining that the number of packets within the receiver buffer meets or exceeds a predetermined threshold prior to changing the transmission channel.

In accordance with further embodiments of the present invention, the method includes periodically scanning channels to determine if the channels are suitable for transmission.

In accordance with various embodiments of the present invention, channels may be suitable for transmission based upon a level of interference within the channel.

In accordance with further embodiments of the present invention, the method includes monitoring a noise floor of the transmission channel.

In accordance with further embodiments of the present invention, the method includes periodically performing a clear channel assessment of a current transmission channel.

In accordance with various embodiments of the present invention, the transmission channel is changed based upon at least one of the noise floor and the clear channel assessment exceeding respective pre-determined thresholds in addition to the number of packets within the transmitter buffer exceeding the predetermined threshold.

In accordance with various embodiments of the present invention, the method includes transmitting a unicast message to one or more receivers indicating that the transmission channel is going to be changed.

In accordance with further embodiments of the present invention, the method includes receiving an acknowledgement message from the one or more receivers.

In accordance with various embodiments of the present invention, the transmission channel is changed upon receipt of at least one acknowledgement message.

In accordance with various embodiments of the present invention, the unicast message includes an indication of an amount of time after receipt of at least one acknowledgement message before the transmission channel is changed.

In accordance with various embodiments of the present invention, the transmission channel is changed after the amount of time has passed after receipt of at least one acknowledgement message.

Various embodiments of the present invention are also directed to an apparatus that comprises a transmission block configured to transmit packets, a transmitter buffer configured to buffer packets for transmission by the transmission block, and a control block configured to monitor a level of packets within the transmitter buffer and to determine if the level of packets exceeds a predetermined threshold. The control block may be further configured to change a transmission channel over which the transmission block transmits packets based at least upon the level of packets exceeding the predetermined threshold.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide an enhanced channel selection mechanism for ensuring switching between transmission channels within a wireless communication network seamlessly and with minimal disruption of reception of a transmitted signal.

Figure 1:
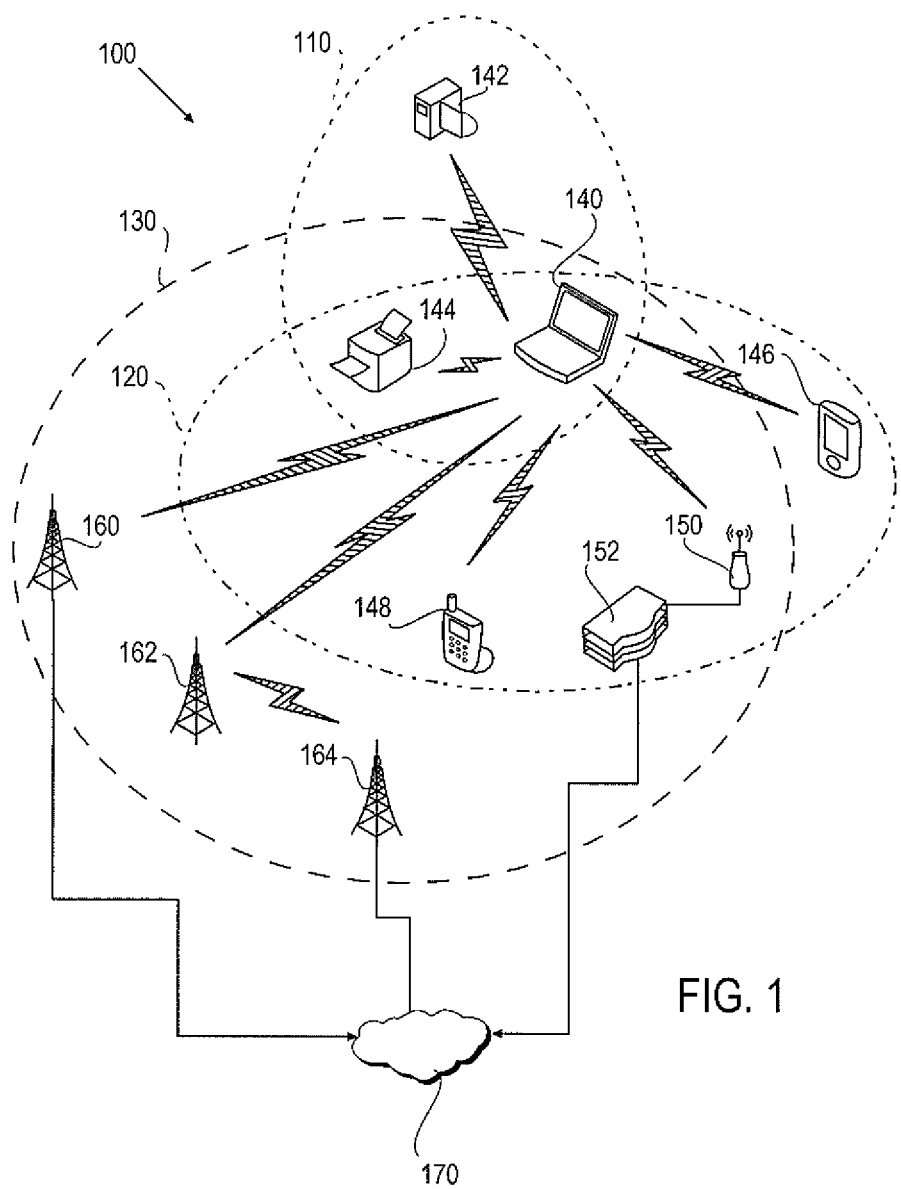
FIG. 1 is a schematic diagram representation of an example wireless communication system, in accordance with various embodiments of the present invention.

Referring to FIG. 1, an example wireless communication system 100, in accordance with various embodiments of the present invention, may include one or more wireless communication networks, generally shown as 110, 120, and 130. In particular, the wireless communication system 100 may include one or more of a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five exemplary subscriber stations, the wireless communication system 100 may include more or less subscriber stations.

The subscriber stations 140, 142, 144, 146, and 148 may use a variety of modulation techniques such as, for example, spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

Additionally, the wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

In accordance with various embodiments, a video source may be a transmitter. Likewise, a subscriber station may serve as a transmitter. It may also serve as a receiver. Additionally, a base station or an access point may also serve as a transmitter or a receiver, or both. For example, a base station may transmit to an access point, which may in turn transmit to a subscriber station, or a subscriber station may transmit to an access point, which may then transmit to the base station. Those skilled in the art will understand that the access point and subscriber station may communicate, i.e., transmit and receive, between themselves without involving a base station, or that a subscriber station may communicate, i.e., transmit and receive, directly with a base station. Additionally, multiple subscriber stations may transmit and receive between each other within various networks such as, for example, a WPAN. For example, a computer may receive video and/or audio information from a video camera.

Thus, each base station, AP and subscriber station may include a receiver, a transmitter, and an antenna. Each component may receive and/or transmit data via its receiver and transmitter, respectively. Each antenna may include one or more directional or omnidirectional antennas such as dipole antennas, monopole antennas, patch antennas, loop antennas, microstrip antennas, and/or other types of antennas suitable for transmission of radio frequency (RF) signals. The functions performed by some of these components may be integrated within a single semiconductor circuit or may be implemented using two or more separate integrated circuits. For example, a receiver may be integrated into a transmitter (e.g., a transceiver). Thus, one or more semiconductor circuits may be configured to include a transmission block, a receiver block and/or a control block to perform in various operations described herein. The methods and apparatus described herein are not limited in this regard.

Figure 2:
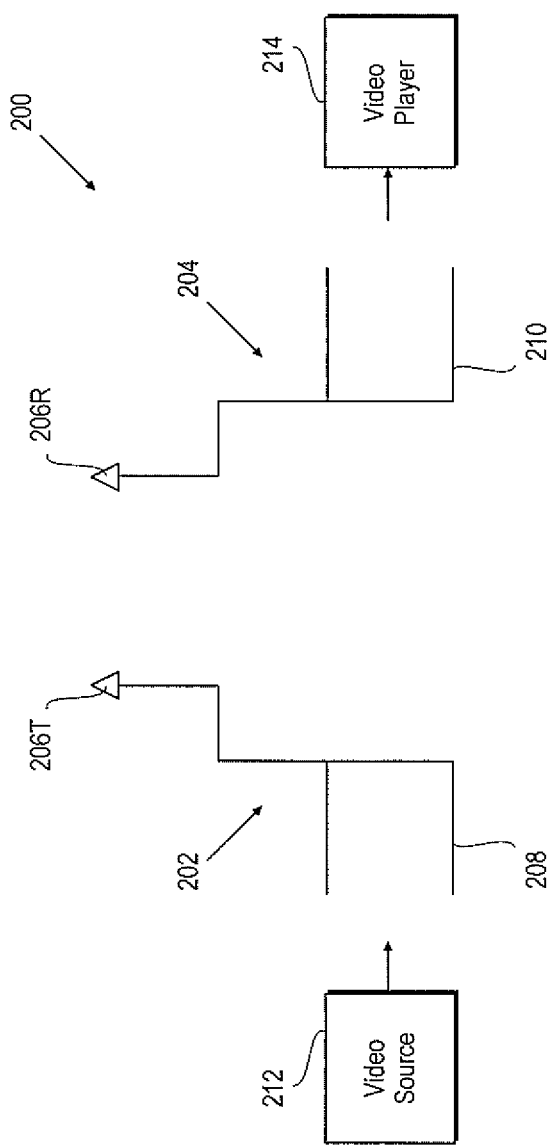
FIG. 2 schematically illustrates a transmission system, in accordance with various embodiments of the present invention.

Referring to FIG. 2, a transmission system 200, in accordance with various embodiments of the present invention, is schematically illustrated. As may be seen, the system 200 includes a transmitter 202 and a receiver 204. Both the transmitter 202 and the receiver 204 include an antenna 206T and 206R. The transmitter 202 includes a transmitter buffer 208, while the receiver 204 includes a receiver buffer 210. A video source 212 is communicatively coupled with the transmitter buffer 208, while a video player 214 is communicatively coupled with the receiver buffer 210. Those skilled in the art will understand that other "information" or "data" sources may be used, in place of video source 212, and that likewise, other types of "information" or "data" processors may be used, in place of video player 214. The video source 212 and video player 214 are being used for the description of this exemplary embodiment for clarity and simplicity, and the present invention is not to be regarded as limited in any way because of this.

The transmitter 202 transmits packets of information over a transmission channel to the receiver 204, which places the packets of information into the receiver buffer 210. In the present example, the packets of information are provided by the video source 212 to the transmitter buffer 208. The packets of information are provided from the receiver buffer 210 to the video player 214. As is known, the buffers 208, 210 are useful to help provide for uninterrupted flows of packets between the video source 212 and the video player 214 due to, for example, interference, noise, etc., in the transmission channel.

When there are problems within the transmission channel that affect transmission, sometimes the problems may be severe enough to warrant changing transmission channels. To this end, the receiver 204 may maintain a list of suitable channels that may be used for transmission. In order to maintain such a list, a background scan may be performed by the transmitter and/or the receiver. IEEE 802.11h and 802.11k outline schemes for such a background scan, and thus, such schemes may be used in accordance with various embodiments of the present invention. Generally, the transmitter 202, for example, an AP, instructs subscriber stations to scan a certain set of channels periodically. This information may be conveyed using measurement requests/response commands as outlined in the IEEE 802.11k, version 5.0 draft. (IEEE 802.11k is currently scheduled to be standardized by 2007.) The AP is thus able to build a set of channels that are clear and suitable for video transmission. As will be described further herein, while such a background scan is done periodically, the condition to start a background scan may depend on the state of a transmitter buffer on the AP.

In accordance with various embodiments of the present invention, a clear channel assessment (CCA) measurement is performed from time to time on a current transmission channel. The time it takes to perform such a CCA measurement depends on the time it takes to switch to a new channel and make a meaningful measurement. As an example, a meaningful measurement means that the system should wait for at least the time it takes for a 1500-byte packet, for example, to be sent at the lowest rate of transmission, for example, 1 Mbps. Assuming that the CCA takes approximately the same time it takes for approximately five packets to be sent at the slowest rate, the system needs to spend about 65 ms on the channel that is being measured. The method to make the measurement request and report the results utilizes the previously mentioned 802.11k methods. In addition, such a CCA measurement may be used in order to determine if a channel is suitable for use as a transmission channel and should be added to the list of potential transmission channels maintained by the AP.

Another potential criterion for a current transmission channel and a potential transmission channel includes a noise floor. The system may monitor the amount of noise (the noise floor) in order to determine how much noise is present within a current transmission channel or a potential transmission channel. When the level of noise exceeds a predetermined noise threshold, then it may be desirable to change the current transmission channel to a different transmission channel. Likewise, when screening potential transmission channels for suitability, if the noise floor within the potential transmission channel exceeds a predetermined threshold, then such channel may not be suitable for addition to the list of potential transmission channels maintained by the AP.

In accordance with various embodiments of the present invention, a background scan may be triggered based upon a periodic timer interrupt within the system indicating that a background scan is due. Additionally, a background scan may be triggered based upon the transmitter buffer being below a predetermined threshold for a level of packets within the transmit buffer. Such a low level within the transmitter buffer 208 indicates that the transmitter 202 is freely able to transmit packets, and thus, packets are not accumulating within the transmit buffer 208 due to problems within the transmission channel. However, before performing such a background scan, it must be determined that the receiver buffer 210 includes an adequate number of packets to continue the flow of packets to the video player 214. As noted above, in the present example, a minimum of five packets should be present within the receiver buffer 210. Accordingly, if a sufficient number of packets are present within the receiver buffer 210, then the transmitter buffer 208 will begin to accumulate the next packets to be transmitted, and the transmitter 202 will suspend transmitting packets. The receiver 204 will then perform a CCA measurement and/or a noise floor assessment of a potential transmission channel. The receiver buffer 210 will continue to provide the packets accumulated within it to the video player 214, thus helping ensure an uninterrupted video stream to the video player 214. Once the CCA measurement is completed, the transmitter 202 may begin to transmit packets from within the transmitter buffer 208 to the receiver 204, generally at a higher rate of transmission in order to refill the receiver buffer while maintaining packets being fed to the video player 214.

When the level of interference within a current transmission channel or the noise floor exceeds a predetermined level, it may be desirable to switch transmission channels. IEEE 802.11h provides a mechanism in a beacon to indicate to subscriber stations that the AP (transmitter) will be switching the transmission channel after the transmission of the nth beacon. In accordance with various embodiments of the present invention, the AP uses unicast transmissions to communicate with the subscriber stations. The AP sends unicast channel switch announcement spectrum management action frames to each subscriber station. The AP may receive an acknowledgment message from each subscriber station that it has received the message. In accordance with various embodiments, the channel switch announcement spectrum management action frame may include a time (in units of Theoretical Beacon Transmission Time (TBTT)) that the AP is going to switch to a transmission channel indicated in the channel switch announcement spectrum management action frame. Generally, a channel switch mode field in the channel switch announcement (CSA) element is set to 1 to indicate that the receiving subscriber station shall transmit no further frames in the basic service set (BSS) until the channel switch is complete. The channel switch count field indicates the number of TBTT units until the announcing AP will switch to the new channel. To reduce latency, the value of the field may be set to zero. This generally implies that the channel switch happens immediately after a subscriber station responds to the channel switch announcement with an acknowledgment message. However, there are cases where a higher value may be needed for this field, thereby indicating that there will be a delay before switching transmission channels, for example, during a subscriber station power-save mode or when the subscriber station is performing an operating system-mandated site-survey.

Figure 3:
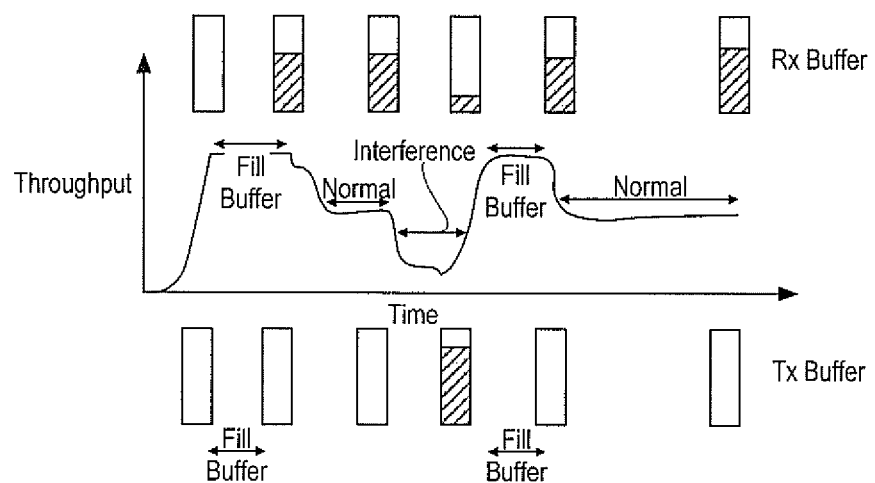
FIG. 3 is a graphical representation of buffering a receiver and a transmitter, in accordance with various embodiments of the present invention.

With reference to FIG. 3, the buffering on the receiver 204 and transmitter 202, in accordance with various embodiments of the present invention, may be summarized. The receiver 204 starts providing packets to the video player 214 when a sufficient number of packets (Rx_buf_HI_th) have been accumulated within the receiver buffer 210. When video starts playing, the transmitter buffer 208 (Tx) is generally empty or very close thereto. When a background scan is performed on a potential transmission channel, the level of the receiver buffer 210 (Rx) falls below a certain threshold, and the transmitter buffer 208 increases above (Tx_buf_HI_th). When the background scan is completed on the potential transmission channel, the transmitter 202 may once again burst accumulated packets from the transmitter buffer 208 to the receiver 204. The transmitter buffer 208 settles down to a level lower than (Tx_buf_LL_th), and the receiver buffer 210 again increases to (Rx_buf_HI_th) or above.

Figure 4:
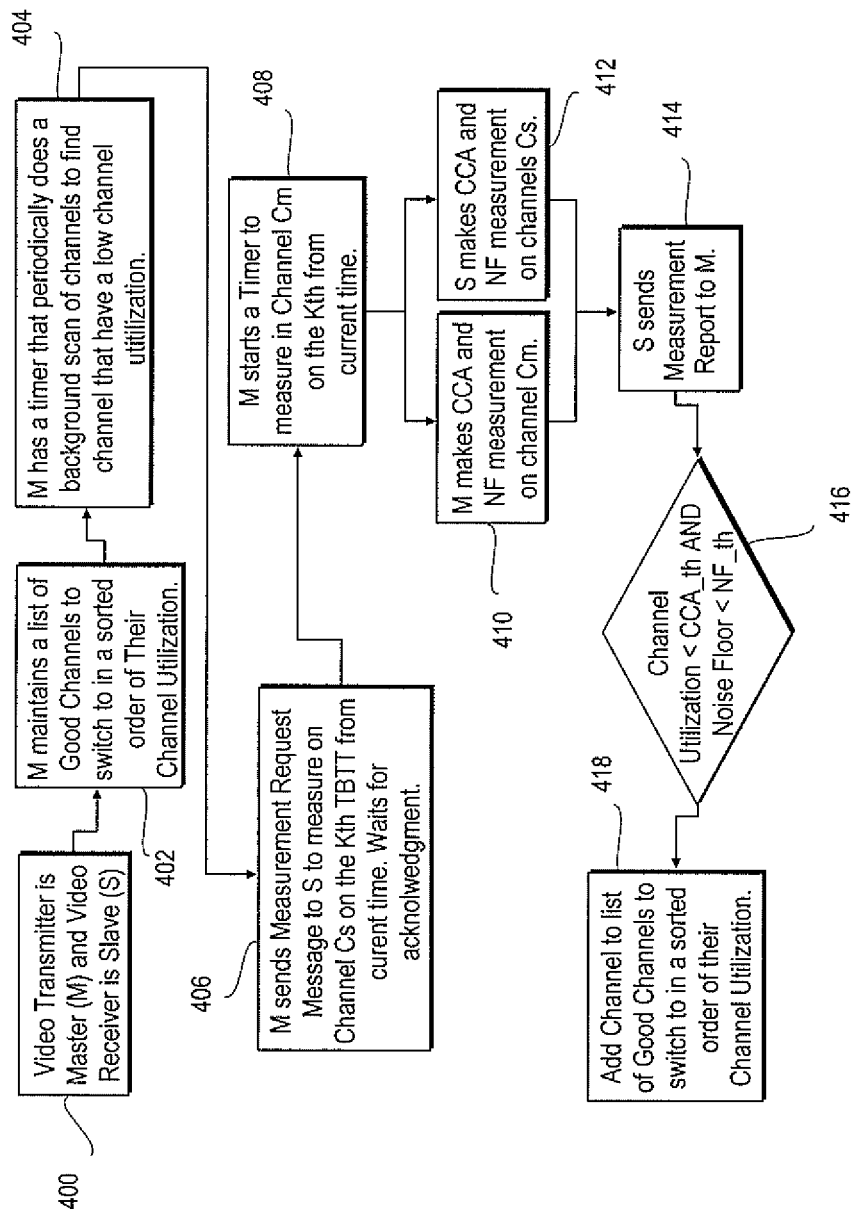
FIG. 4 is a flow chart describing performing a background scan of transmission channels, in accordance with various embodiments of the present invention.

With reference to FIG. 4, an example of a method of performing a background scan for determining potential transmission channels, in accordance with various embodiments of the present invention, may be summarized. At 400, a video transmitter is deemed to be Master (M) and a video receiver is deemed to be Slave (S). At 402, M maintains a list of acceptable channels that may potentially be switched to for use as a transmission channel. Preferably, these channels are maintained in a sorted order of their level of channel utilization. At 404, M has a timer that periodically indicates that it is time for a background scan of channels in order to locate potential channels that have a low channel utilization. At 406, M sends a measurement request message to S to measure on channel Cs at the Kth Theatrical Beacon Transmission Time (TBTT) unit from the current time. M waits for acknowledgment. At 408, M starts a timer to measure on channel Cm on the Kth TBTT unit of time from the current time. At 410, M performs a CCA and noise floor measurement on channel Cm, while simultaneously at 412, S performs a CCA and noise floor measurement on channel Cs. At 414, S sends a measurement report to M. At 416, if the channel utilization is less than CCA_th and the noise floor is less than NF_th, than at 418, the channel is added to the list of acceptable channels that may be switched to for use as a transmission channel. The channel is preferably added in a sorted order of its level of channel utilization.

Figure 5:
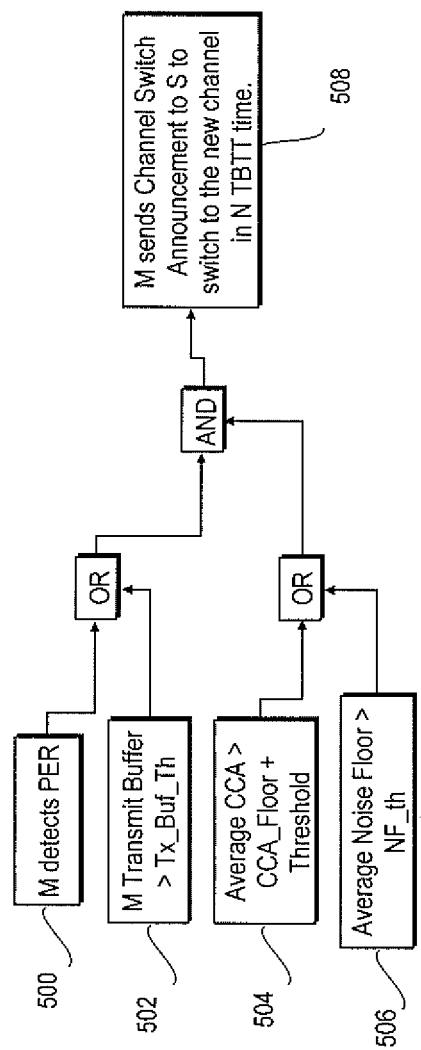
FIG. 5 is a flow chart describing switching transmission channels, in accordance with various embodiments of the present invention.

With reference to FIG. 5, an example of a method of when to switch transmission channels, in accordance with various embodiments of the present invention, may be summarized. If M detects a Packet Error Rate (PER) (at 500) or M's transmit buffer is greater than Tx_Buf_Th (at 502), and the average CCA is greater than a CCA Floor plus a threshold (at 504) or Average Noise Floor is greater than NF_th (box 508), M sends a channel switch announcement to S announcing a switch to a new channel as the transmission channel. The switch will take place in N TBTT units of time.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
monitoring a number of packets within a transmitter buffer of a transmitter;
determining whether the number of packets within the transmitter buffer exceeds a first predetermined threshold;
monitoring a noise floor of a first transmission channel used by the transmitter for transmission of packets within the transmitter buffer;
periodically performing a clear channel assessment of the first transmission channel;
changing the transmission of packets from occurring over the first transmission channel to a second transmission channel in response to
the number of packets within the transmitter buffer exceeding the first predetermined threshold, and
if at least one of (i) the noise floor exceeds a second predetermined threshold, or (ii) the clear channel assessment exceeds a third predetermined threshold; and
in response to determining that the number of packets within the transmitter buffer of the transmitter is less than a fourth predetermined threshold, scanning one or more potential channels to determine if the one or more potential channels are suitable for transmission,
wherein the second transmission channel is different from the first transmission channel.

2. The method of claim 1, further comprising:
monitoring a number of packets within a receiver buffer of a receiver; and
prior to changing the transmission of packets from occurring over the first transmission channel to the second transmission channel, determining that the number of packets within the receiver buffer meets or exceeds the fourth predetermined threshold.

3. The method of claim 2, further comprising:
periodically scanning one or more channels to determine if the one or more channels are suitable for the transmission of packets,
wherein the second channel is a channel of the one or more channels determined to be suitable for the transmission of packets.

4. The method of claim 3, wherein a channel of the one or more channels is determined to be suitable for the transmission of packets based upon a level of interference within the channel.

5. The method of claim 3, further comprising:
prior to changing from the transmission of packets from occurring over the first transmission channel to the second transmission channel, transmitting a first message over the first transmission channel to one or more receivers indicating that the transmission of packets over the first transmission channel is going to be changed to occur over the second channel.

6. The method of claim 5, further comprising:
receiving an acknowledgment message from the one or more receivers, wherein the acknowledge message is received in response to the first message.

7. The method of claim 6, wherein the transmission of packets is changed to occur over the second channel upon receipt of at least one acknowledgment message.

8. The method of claim 6, wherein the first message includes an indication of an amount of time to lapse until the transmission of packets is changed to the second transmission channel.

9. The method of claim 1, further comprising:
monitoring a number of packets within a receiver buffer of a receiver; and
in response to determining that the number of packets within the receiver buffer of the receiver exceeds a fifth predetermined threshold, scanning the one or more potential channels to determine if the one or more potential channels are suitable for transmission.

10. The method of claim 1, further comprising:
monitoring a number of packets within a receiver buffer of a receiver; and
in response to determining that (i) the number of packets within the transmitter buffer of the transmitter is less than the fourth predetermined threshold and (ii) the number of packets within the receiver buffer of the receiver exceeds a fifth predetermined threshold, scanning the one or more potential channels to determine if the one or more potential channels are suitable for transmission.

11. An apparatus comprising:
a transmitter buffer configured to buffer packets for transmission by the transmission block;
a transmitter block configured to transmit, over a first transmission channel, the packets buffered within the transmitter buffer; and
a control block configured to
monitor a level of packets within the transmitter buffer, and determine whether the level of packets within the transmitter buffer exceeds a first predetermined threshold,
monitor a noise floor of the first transmission channel being used by the transmission block for transmission of packets within the transmitter buffer,
periodically perform a clear channel assessment of the first transmission channel, change the transmission of packets from occurring over the first transmission channel to a second transmission channel in response to
  the level of packets within the transmitter buffer exceeding the first predetermined threshold, and
  if at least one of (i) the noise floor exceeds a second threshold or (ii) the clear channel assessment exceeds a third predetermined threshold, and
  in response to determining that the number of packets within the transmitter buffer of the transmitter is less than a fourth predetermined threshold, scan one or more potential channels to determine if the one or more potential channels are suitable for transmission,
  wherein the second transmission channel is different from the first transmission channel.

12. The apparatus of claim 11, wherein the control block is further configured to:
  monitor a level of packets within a receiver buffer of a receiver; and
  prior to changing the transmission of packets from occurring over the first transmission channel to the second transmission channel, determine that the level of packets within the receiver buffer meets or exceeds the fourth predetermined threshold.

13. The apparatus of claim 11, wherein:
  the control block is further configured to periodically scan one or more channels to determine if the one or more channels are suitable for the transmission of packets; and
  wherein the second channel is a channel of the one or more channels determined to be suitable for the transmission of packets.

14. The apparatus of claim 13, wherein a channel of the one or more channels is determined to be suitable for the transmission of packets based upon a level of interference within the channel.

15. The apparatus of claim 13, wherein:
  prior to the control block changing the transmission of packets from occurring over the first transmission channel to the second transmission channel, the transmission block is configured to transmit a first message to one or more receivers indicating that the transmission of packets over the first transmission channel is going to be changed to occur over the second transmission channel.

16. The apparatus of claim 15, further comprising a receiver block configured to receive an acknowledgment message from the one or more receivers, wherein the acknowledge message is received in response to the first message.

17. The apparatus of claim 16, wherein the transmission block and the receiver block are components of a transceiver.

18. The apparatus of claim 16, wherein the control block is configured to change the transmission of packets from occurring over the first transmission channel to the second transmission channel upon receipt of at least one acknowledgment message.

19. The apparatus of claim 16, wherein the first message includes an indication of an amount of time to lapse until the transmission of packets is changed to the second transmission channel.

* * * * *